United States Patent [19]

Sullins

[11] Patent Number: 4,729,548
[45] Date of Patent: Mar. 8, 1988

[54] REFRACTORY COATING FOR METAL

[75] Inventor: Harry P. Sullins, Columbia, S.C.

[73] Assignee: Richland Industrial, Inc., Columbia, S.C.

[21] Appl. No.: 903,794

[22] Filed: Sep. 4, 1986

[51] Int. Cl.$^4$ ............................................... C21B 7/16
[52] U.S. Cl. .......................................... 266/44; 75/53; 75/58; 266/270
[58] Field of Search ................... 266/270, 44; 75/53, 75/58

[56] References Cited

U.S. PATENT DOCUMENTS

| | | | |
|---|---|---|---|
| 2,360,109 | 10/1944 | Converse | 138/64 |
| 3,430,940 | 3/1969 | Criss | 266/35 |
| 3,681,051 | 8/1972 | Takashima | 75/53 |
| 3,976,286 | 8/1976 | Thompson et al. | 266/225 |
| 3,979,246 | 9/1976 | Ikeda et al. | 156/187 |
| 4,059,712 | 11/1977 | Bothwell | 428/36 |
| 4,087,081 | 5/1978 | Michaelis | 266/142 |
| 4,093,193 | 6/1978 | Cassidy et al. | 266/87 |
| 4,296,921 | 10/1981 | Hayashi | 266/270 |

FOREIGN PATENT DOCUMENTS 2028987 3/1980 United Kingdom.

OTHER PUBLICATIONS

The Making, Shaping and Treating of Steel, U.S. Steel (9th Ed.), pp. 36–65.

Primary Examiner—Peter D. Rosenberg
Attorney, Agent, or Firm—Pollock, Vande Sande & Priddy

[57] ABSTRACT

Disclosed is a heat resistant composite comprising a refractory coating on a metal substrate. The refractory coating is provided by mixing a refractory mortar with water, impregnating a water absorbent web of fibrous material with the liquid mixture, placing at least one layer of the impregnated web on a surface of the substrate as a coating, and drying the coating to remove the water and cause the refractory mixture to chemically bond. The substrate may be a pipe protected by the coating for use in injecting a refining agent beneath the surface of a molten metal composition comprising a scrap metal such as copper or aluminum.

33 Claims, 17 Drawing Figures

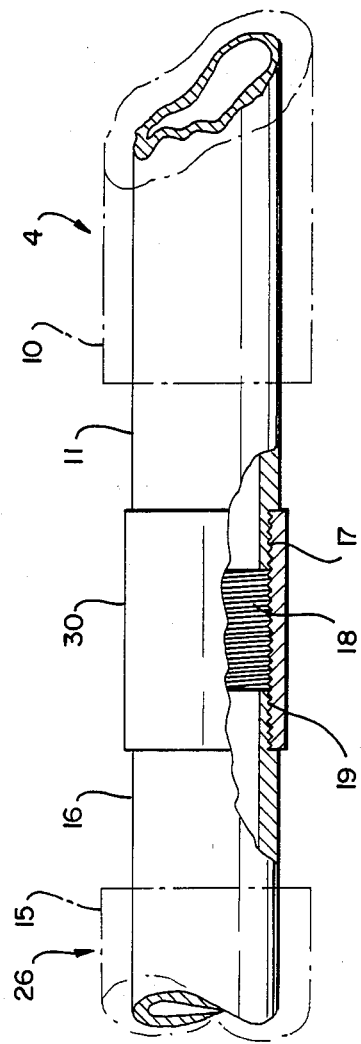
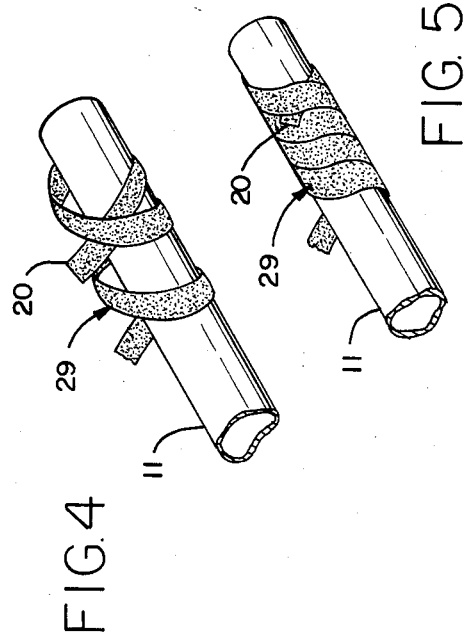
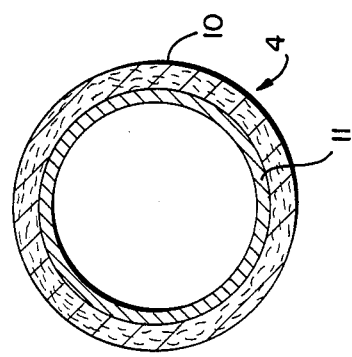

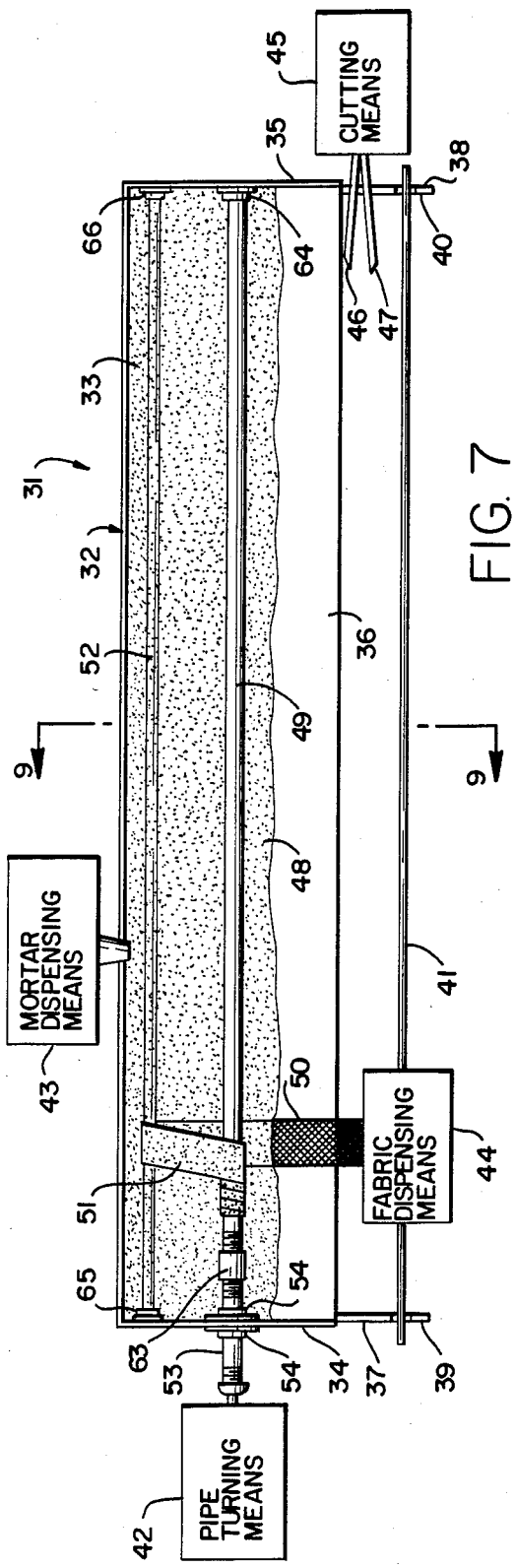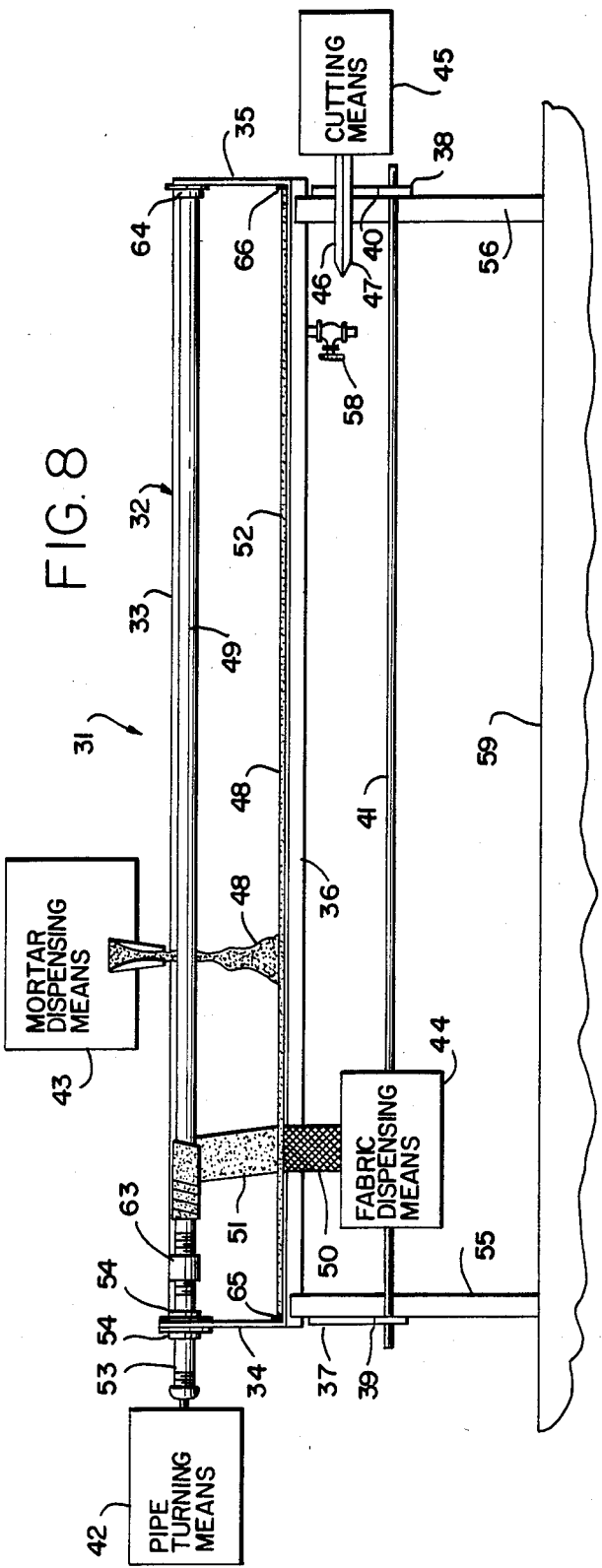

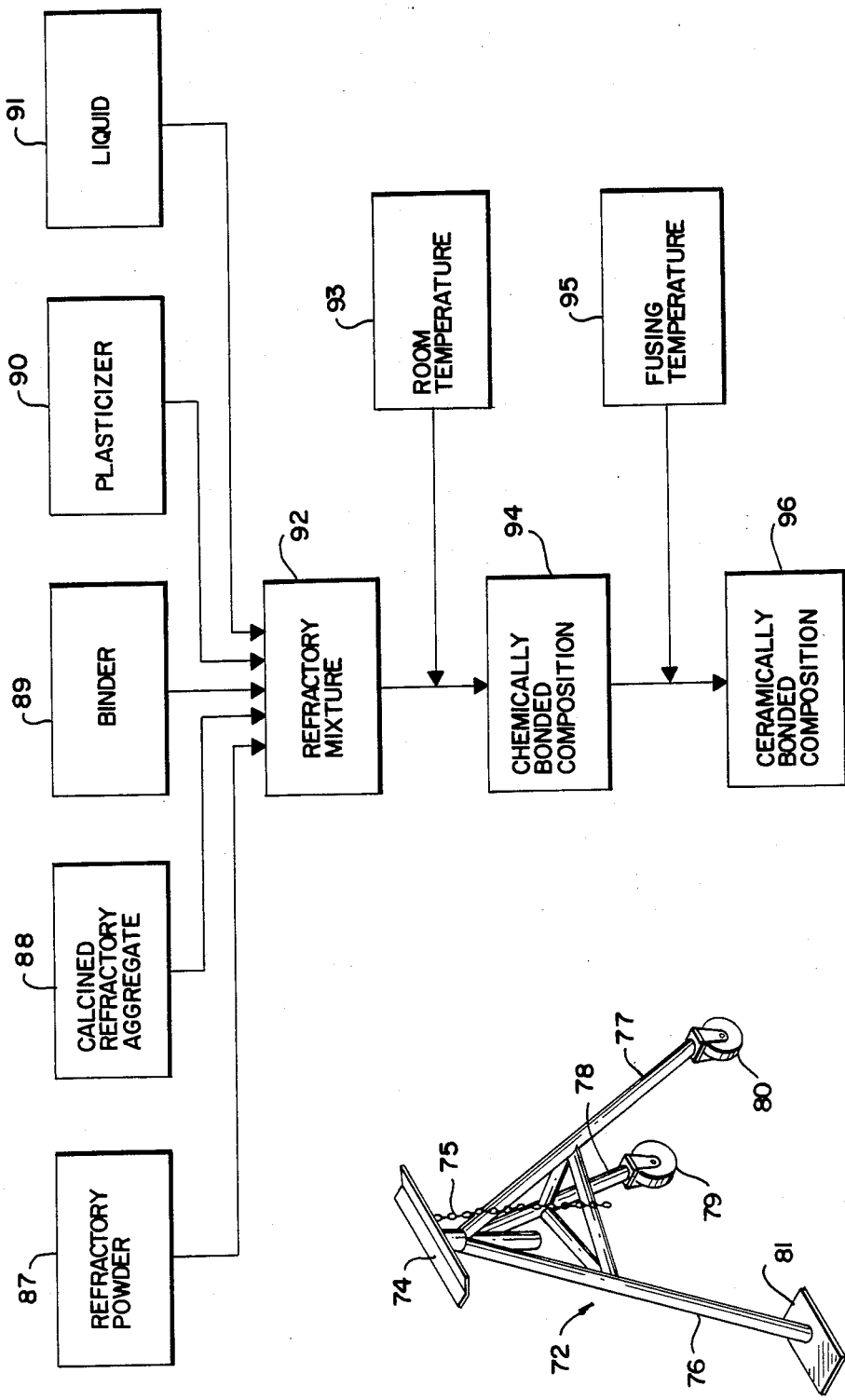

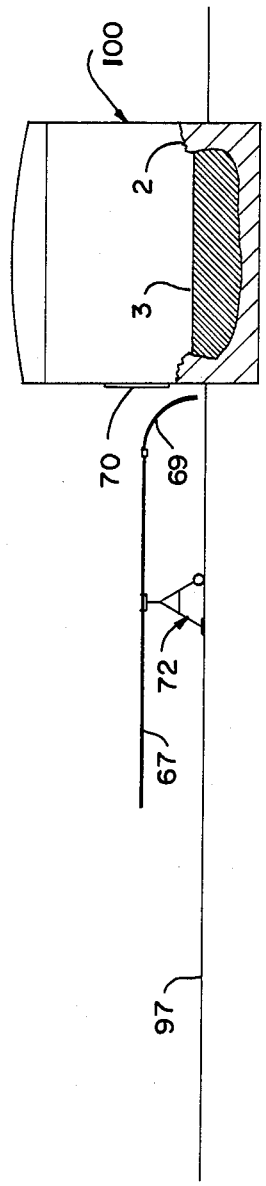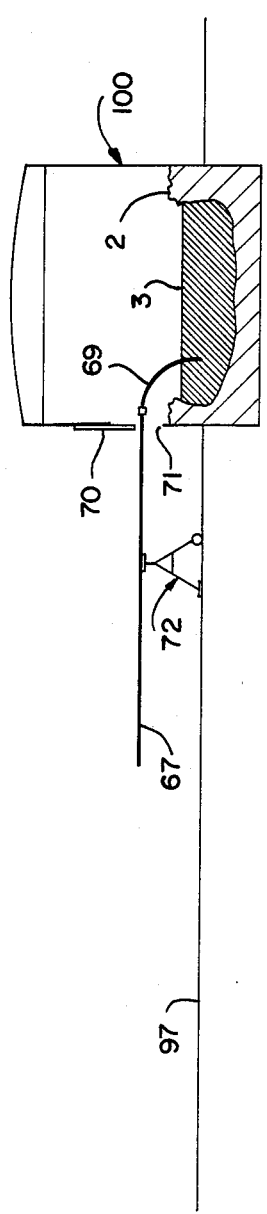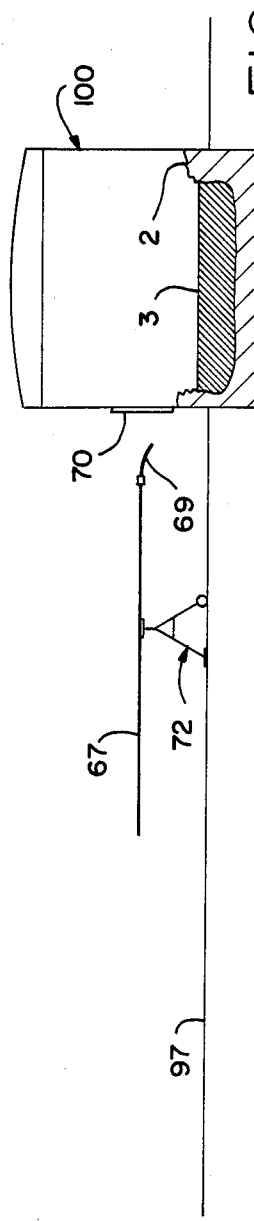

REFRACTORY COATING FOR METAL

FIELD OF THE INVENTION

This invention relates to a refractory coating for extending the useful life of a metal substrate in the presence of a molten metal composition, and more particularly to a coated metal pipe useful in the refining of ferrous and non-ferrous metals. A method and device for manufacturing the product also is disclosed.

BACKGROUND OF THE INVENTION

In a blast furnace, smelting furnace, reclaiming furnace, or similar operation for melting and processing metals, a metal pipe is utilized to inject a refining agent beneath the surface of a molten metal composition held in a refractory vat or other container to aid in the removal of impurities from the metal. Previously, the pipe used to transport the refining agent would be consumed rapidly within the vat and need to be replaced on a frequent basis. Disclosed herein is a refractory coating which substantially reduces the rate of consumption of the metal pipe.

DISCLOSURE OF THE INVENTION

The improved pipe of the invention can perform the function of injecting a reducing or other refining agent beneath the surface of a molten metal bath while lasting many times the life span of the previously used uncoated pipe. It is therefore an object of the present invention is provide an improved lance for injecting a refining agent directly into a molten metal composition within a melting vat.

A further object of the present invention is to utilize a metal pipe as a core or base structure for an improved refractory coating to provide a composite pipe or lance for injecting a refining agent into a desired area within a melting vat for refining and/or reclaiming a metal.

Another object of the present invention is to provide means for securing a new lance segment to a partially consumed lance segment in order to continue the flow of a refining agent to a desired area within a melting vat. metal pipe which is to be used within a metal melting vat in order to extend the life span of the pipe.

Another object of the present invention is to use a water absorbent, non-refractory web in order to coat a metal substrate with a refractory composition and thereby provide a composite for use in contact with a molten metal composition.

Still another object of the present invention is to immerse an absorbent non-refractory wrapping material in a liquid refractory mixture in order to provide a flexible refractory material for wrapping a metal pipe to make a composite pipe for use in a metal melting vat.

Another object of the present invention is to impregnate and coat a porous flexible web by passing the web around a tension bar immersed in a liquid refractory mixture and then wind the impregnated and coated web onto a pipe base under tension.

Still another object of the present invention is to remove the excess of a liquid homogenous refractory mixture impregnated into an absorbent web by skimming the excess mixture from the web.

Another object of the present invention is to provide a fast-drying refractory wrap which may be trapped and secured around a pipe base to form a refractory coated pipe which is fast-drying.

A further object of the present invention is to provide a composite which may be shaped into a desired bent configuration after an absorbent web impregnated with a liquid refractory mixture has been coated and dried on a substrate of the composite.

A further object of the present invention is to surround a metal pipe with a non-refractory web embedded within a cured and dry refractory composition to enable the pipe to be bent into curved shapes without fracture or separation of the refractory composition.

Still another object of the present invention is to provide a pipe coated with a dried and chemically reacted refractory composition which does not separate from the pipe or fracture when the coated pipe is bent into non-linear shapes.

The present invention also provides a method and apparatus for manufacturing the composite pipe. These and other objects and features of the invention will be apparent from the following description and appended claims.

According to the present invention, a water absorbent web of porous material is impregnated with a curable liquid refractory mixture. One or more plies of the impregnated web are applied to a metal substrate before the refractory mixture sets and while it is still liquid (wet). The composite pipe is then air dried, either at ambient temperature or with heating, to form a dry refractory coating firmly adhered to the substrate. The impregnated web may be used to provide a dry refractory coating on a wide variety of metal substrates, such as steel plates, bars and pipes. A preferred application is the provision of a dry refractory coating on carbon steel pipes which are used as lances for injecting reducing gases and other refining agents beneath the surface of a molten mass comprising a metal being refined or otherwise treated to produce substantially pure metal from a metal ore or from scrap metal. The refractory coating extends by a substantial amount the usable life of the metal substrate when in contact with a molten metal composition at temperatures in the range of preferably about 1100° F. to about 3400° F., more preferably about 1400° F. to about 3200° F., and most preferably about 2000° F. to about 2800° F.

The liquid refractory mixture is preferably a refractory mortar mixed with water. As used in this specification, "refractory mortars" comprise finely ground dry refractory material which becomes plastic when mixed with water, is air or heat settable, and is suitable for use in laying refractory brick of the type used in making the lining of furnaces such as those used in refining metals. The preferred refractory mortars generally comprise at least one high temperature (calcined) refractory aggregate, and at least one raw (naturally occurring) refractory powder, such as the various commercially available clays which may serve as a binder for the aggregate. Additional refractory aggregates and/or additional refractory powders may be used in various combinations. Where the clay used does not provide sufficient cohesiveness, special binder materials also may be present. Also, special plasticizing materials may be present to improve the workability of the liquid mortar composition.

The refractory mortar composition of the present invention preferably comprises about 50% to about 60% calcined bauxite as a first refractory aggregate, about 20% to about 30% calcined flint clay or kaolin clay as a second refractory aggregate, about 5% to about 15% raw flint clay or kaolin clay as a refractory powder, and about 5% to about 15% of sodium silicate as a binder, all percentages being by weight unless otherwise specified. Preferably, the mortar further includes about 1% to about 2.5%, based on the total weight of the other dry components (usually inorganic oxides), of organic starch which serves as a plasticizer to improve the handling characteristics of the mortar when it is mixed with water (for example, its workability and body).

The particle size of the refractory aggregates is preferably less than about 35 mesh, more preferably in the range of about 65 mesh to about 100 mesh. The particle size of the refractory powder is preferably less than about 325 mesh and the particle size of the sodium silicate and starch should be sufficiently fine to dissolve readily in water, preferably less than about 100 mesh, more preferably less than about 200 mesh, and most preferably less than about 325 mesh. The bauxite preferably is of the type found in South America, more preferably in the countries of Surinam and Guyana. The sodium silicate is preferably of an anhydrous type which dissolves more slowly in water than the hydrated types.

Refractory mortars of the type employed in the invention are commercially available and may be obtained either wet (premixed with water) or dry. Wet mortars are available from both Babcock & Wilcox of Augusta, Ga., and the AP Green Company of Mexico, Mo. The dry mortar preferably contains about 67% alumina, about 27% silica and about 2% sodium oxide relative to the total weight of inorganic oxides.

A preferred refractory mortar is available as a dry mortar mix designated Mul-Set F from Babcock & Wilcox, Insulating Products Division, Augusta, Ga. The liquid refractory composition is made up by mixing this dry mortar with water, preferably at a temperature of about 160° F. to about 170° F., to provide a composition having a slurry-like consistency. The weight ratio of water to mortar is preferably about 10% to about 15%, more preferably about 12% to about 14%, most preferably about 13%. This liquid mortar composition is air setting. According to Babcock and Wilcox, the air set composition has a maximum service temperature of about 3200° F., and the dry mortar prior to admixture with water and in the absence of starch has the following chemical analysis:

TABLE I

| Chemical Analysis of dry Mul-Set F: | | |
|---|---|---|
| Name | Chemical Symbol | Percent |
| Alumina | $Al_2O_3$ | 67.1 |
| Silica | $SiO_2$ | 27.0 |
| Titanium Oxide | $TiO_2$ | 2.37 |
| Ferric Oxide | $Fe_2O_3$ | 1.20 |
| Calcium Oxide | CaO | 0.05 |
| Magnesium Oxide | MgO | 0.04 |
| Sodium Oxide | $Na_2O_3$ | 2.06 |
| Potassium Oxide | $K_2O$ | 0.19 |

The web material is made preferably from a porous, non-refractory, organic fiber, preferably a naturally occurring fibrous material, more preferably a plain-woven fabric of jute or hemp known as burlap. A jute burlap is preferred as being more water absorbent, flexible and stretchable. A preferred burlap is an open weave fabric of tightly and cleanly spun jute threads, a preferred thread size being about 20 to about 60 mils, more preferably about 30 to about 40 mils. The burlap fabric is preferably relatively light in weight, about 6 to about 8 ounces per square foot being preferred and about 7 ounces per square foot being most preferred.

The burlap is preferably woven so that the fabric has a warp of about 10 to 12 threads per inch and a weft of about 8 to 10 threads per inch. A preferred jute burlap is sold as 7 ounce burlap and is available from Harper Crawford Bag Company of Charlotte, N.C. The burlap is sufficiently water absorbent to provide a good capillary or "wicking" action which conveys moistures to the edges of the web and to the outer surface of the outermost wrap or winding of the web so as to facilitate rapid drying of the impregnated and wound burlap web.

The core or base of the coated pipe or lance of the present invention comprises a standard metal pipe. Although a wide variety of metal pipes may be used, the preferred metal pipe is made of relatively inexpensive carbon steel, such as A-120 carbon steel. While the size of the pipe also may vary over a wide range, the preferred pipe size for metal refining lances has a nominal diameter of about 1 inch. The thickness of the pipe also may vary over a wide range, the diameter and wall thickness of the pipe combining to define the weight of the pipe per unit length. In selecting a pipe wall thickness, the cost of the pipe must be balanced against the effect of increased thickness on its useful life, pipes of greater wall thickness tending to last somewhat longer in a molten metal bath but also costing more. Thus, while either heavier or lighter pipe may be used in practicing the invention, ASTM Schedule 40 pipe is preferred as being the best balance between the cost of the material and the rate of consumption of the coated pipe. The weight of carbon steel schedule 40 pipe is about 1.68 pounds per linear foot, whereas the weight of carbon steel schedule 80 pipe is about 2.17 pounds per linear foot. Where pipe couplings are used to secure one threaded segment of coated pipe to the next, the couplings are preferably standard merchants couplings.

For ease of winding and for use as a lance in metal refining, each pipe core segment is preferably about 10½ feet long. After being impregnated with the liquid refractory composition, the coated burlap web is wound onto a 10½ foot pipe segment, preferably using the apparatus and method described below. The coated length is preferably about 10 feet 2 inches, leaving about 2 inches at either end for connection to adjoining pipe segments, about 1.25 inches of each end preferably being threaded for a coupling. The burlap web preferably is about 6 inches wide and preferably is wound so that each winding overlaps the next by about 5 to about 5.25 inches, thereby leaving about ¾ to 1 inch of the previous winding uncovered. This gives a total of about 6 to about 8 spiral wraps per 6 inches of pipe length such that after the initial 5 to 5¼ inches of wrapped pipe, there are a total of 6 to 8 plies of the coated burlap web layered one on top of the other. This requires about 17 yards of the preferred burlap material for each pipe segment of 10½ feet. The 6 to 8 plies of coated burlap web increases the outside diameter of a 1 inch nominal diameter schedule 40 pipe from about 1.25 inches to about 2.25 inches. The weight of this coated pipe is about 2.75 pounds per linear foot.

Using the apparatus and method of the invention, the wrapping of each 10.5 foot segment requires only about 20 to 25 seconds. This method and apparatus also provides sufficiently tight windings that the coating composition is caused to flow or "weep" through the successive layers of porous burlap so that any excess coating material will flow to the exterior surface of the last wrap of burlap, from which it may be removed or "skimmed" by hand or mechanical means. After the excess liquid composition is removed from the wrapped pipe, the coated pipe is removed from the apparatus and put aside to air dry. This drying process may be speeded up by radiant and/or convection heating, but this may add significantly to the cost and is preferably avoided. So as to maintain a relatively uniform drying rate throughout the transverse cross-section of the coating and thereby facilitate air drying, each segment of coated pipe is preferably stood on one end and supported in this vertically extending position throughout the drying process by a rack or other vertical support, such as a wall.

The rate of air drying of the wrapped coating on the pipe may vary greatly depending on the type of burlap used and the composition of the refractory mortar, particularly the nature of the sodium silicate ingredient. Thus, while other refractory mortar compositions may be used for the coating and other woven or non-woven burlap webs may be used, drying times with such materials may vary between one and several weeks. A major advantage of the preferred burlap web impregnated with the preferred refractory composition is that the wrapped pipe coating will dry sufficiently for handling of the composite lance in about 3 days, although drying for one or two more days may be employed to insure the quality of the final product.

The coated pipe of the present invention is used as a lance to inject a reducing gas or other treating agent for purifying a metal, preferably a non-ferrous metal, more preferably copper or aluminum. About 3 to 8 feet, preferably about 5 feet, of the lance is immersed below the surface of a bath of the molten metal contained in the vat portion of a furnace so as to inject the reducing agent, preferably an oxygen containing gas such as air, well below the surface of the molten metal bath.

The coated pipe of the present invention has many advantages over the use of a bare (uncoated) metal pipe as a lance for introducing reducing or other treating agents below the surface of a molten mass of copper maintained at a temperature of about 2700 to about 2800° F. in a refining or reclaiming furnace. While a 10½ foot segment of bare schedule 40 pipe is consumed in about 3 minutes, the coated schedule 40 pipe lasts about 45 to 60 minutes. The life of the pipe core is thus extended by a multiple of at least about 10 times, preferably about 15 to 16 times, by using the refractory coating of the present invention.

Even with the increased material and labor costs associated with making the coated pipe, use of the coated pipe results in an overall savings in material costs of about ⅔ relative to the material costs of using bare pipe. In other words, the cost of using the coated pipe is about ⅓ of the cost of using bare pipe when considering only the cost of the bare pipe material versus the cost of the coated pipe material. The invention provides still further cost savings by reducing the labor costs associated with actually inserting the consumable lances into the molten metal bath of a furnace since the number of 10½ foot segments of coated pipe required is substantially less than the number of bare pipe segments otherwise used. These labor costs are also reduced by a factor of 3, that is, the cost of handling the lance of the present invention at the refinery is about ⅓ of the cost of handling a bare pipe lance.

A further advantage of the present invention results from the use of substantially less (by a factor of as much as 15 or 16) metallic pipe, which is preferably carbon steel. Consumption of carbon steel pipe in a furnace for refining non-ferrous metals introduces iron and other contaminates into the non-ferrous metal being refined. Thus, use of the present invention reduces such contamination by about the same factor, namely, contamination with the present invention is about 1/15th or 1/16th of that experienced with bare pipe. Very little additional contamination results from the coating material since the burlap is burned and removed as gaseous combustion products, and the refractory composition deposits out in the slag as additional refractory material similar to the refractory bricks of the furnace itself.

A still further advantage of the invention is that the coated pipe may be bent through a significant arc after the coating has set by air drying. This allows the coated pipe to be bent so as to form a curved lance that may be inserted in the furnace through a side door instead of an overhead door. Thus, the coated pipe of the present invention is easily bent into non-linear shapes and therefore easily adapted for use in furnaces having side entry or offset overhead entry doors. The lances may be delivered as straight segments of coated pipe and then bent by the end user into an appropriate shape without cracking or other fracture of the refractory coating. It is believed that the burlap web of the preferred embodiments makes the dried coating sufficiently stretchable and flexible to prevent fracture of the coating and/or its separation from the metal pipe core.

The metal pipe base provides an elongated tubular core structure with a continuous opening from the first end of the pipe base to the second end of the pipe base through which the refining agent may travel. The refining agent is preferably a gas or a pneumatically conveyed solid. The material secured to and surrounding the pipe base is operative to insulate the pipe base from the molten metal and other heated external surroundings in the melting vat when the lance is placed in the melting vat. A first connecting area on the first end of the pipe base extends outward from the refractory material which is secured around the pipe base. A second connecting area on the second end of the pipe base extends outward from the refractory material which is secured around the pipe base. The first connecting area has a threaded portion and the second connecting area has a threaded portion.

The coated web improves the insulating properties of the pipe. The plasticizer and binder components aid in holding the coated web on the pipe base. The free end of the coated web is preferably secured under the first one or two windings of the coated web in order to lock the beginning portion of the spiral windings securely onto the pipe base. Although an uncoated or dry web may first be wound around the pipe base and then impregnated with the liquid refractory coating composition, it is preferred to first coat the web and then wind the coated web around the pipe base.

A device is disclosed for placing the impregnated web around a pipe base or other metal core. The device has a trough, pipe securing means positioned above the base of the trough, pipe turning means, and web dispensing means. The securing means is operative to rigidly secure the pipe in position for rotation about its longitudinal axis. The turning means is connected to the securing means and is operative to turn the securing means and the pipe attached thereto. The dispensing means is operative to dispense the web after it has been secured to the pipe and when the turning means turns the pipe to wind the web thereon.

The liquid refractory coating composition is placed within the trough and the web is moved through the trough prior to being placed around the pipe. Bar means is secured within the trough above the base of the trough and below the normal level of the coating composition. The web is pulled around the bar means in order to move the material through the coating composition and onto the pipe. Liquid dispensing means is located outside of the trough and is operative to feed the coating composition to the trough.

Cutting means is operative to cut the web dispensed from the web dispensing means when the coated web has been completely placed around the pipe in the desired number of windings and/or layers. The securing means comprises a drive shaft portion which connects to the turning means and a coupler portion which connects the drive shaft to the pipe and to which the pipe may be rigidly secured.

The method for placing the web material around a pipe base comprises securing a segment of the pipe above the trough, securing the free end of the web material from the web dispensing means to the pipe, and turning the pipe. When the pipe is turned, the web material is pulled from the web dispensing means and wrapped around the pipe. The coating composition is placed in the trough and the web material is pulled through this composition when the pipe is turned The method further comprises causing the web material to move around a bar means within the trough in order to pull the material beneath the surface of the coating composition and force the composition into the porous and water absorbent web material when the pipe is turned. The method further comprises moving the web dispensing means along the length of the trough, thereby enabling the web to be wound spirally around the length of the pipe segment. The tail end of the web material for each pipe segment is cut from the continuous supply of web material provided by the web dispensing means after the desired length of web has been placed around the length of the pipe segment. The method further comprises removing excess coating composition from the web material after the web has been placed around the pipe. The coated pipe is then removed from above the trough and placed into preferably a vertical position to dry.

The refractory composition, upon drying at room temperature, forms a chemically-bonded dry refractory coating in which the web material is permanently embedded. This dry refractory composition, at temperatures sufficiently high to fuse glass and the like, forms a ceramically-bonded refractory coating from which organic web material has been substantially removed by combustion.

The liquid mixed with the dry refractory mortar is preferably potable water. The specific type and proportions of each component of the refractory mortar may be determined relative to the pH value of the molten metal composition in the melting vat. The coated pipe may be shaped into a desired configuration after the coating mass has been set and cured, without breaking either the pipe base or the coating mass. The pipe may be shaped into the configuration of a non-linear pipe with a radial bend. The angle of the radial bend preferably is in the range from greater than 0° to about 90°.

The process for treating a molten metal composition with the coated pipe comprises providing a supply of a refining or other treating agent, and utilizing the coated pipe to convey the treating agent from this supply to the desired area of a melting vat containing the molten metal composition. Where the furnace surrounding the vat has a side entrance, transport means also may be utilized to support the coated pipe in a horizontal position. The transport means also helps move the free end of the horizontal pipe through the side entrance and to the desired area of the melting vat. Where a non-linear pipe with a radial bend is used, a supply end portion is secured to the transport means so as to aid in placing the free end of the pipe opposite to the supply end into the desired area of the melting vat.

BRIEF DESCRIPTION OF THE DRAWINGS

The invention may be understood more fully from the following detailed description and appended claims when taken with the drawings in which:

FIG. 2 is a transverse sectional view of lance pipe 4 taken along lines 2—2 of FIG. 1.

FIG. 3 is a fragmentary view in partial section of a new lance pipe 26 secured to lance pipe 4 of which a major portion has been consumed in a melting vat.

FIG. 4 is a fragmentary perspective view showing a pipe base 11 being wrapped with a web 29 of coating material which is in loose form and has a free leading end 20.

FIG. 5 is a fragmentary perspective view similar to FIG. 4 but showing the web 29 of coating material drawn tightly around the pipe base 11.

FIG. 7 is a top plan view of a pipe coating device 31.

FIG. 8 is a front elevational view of pipe coating device 31.

FIG. 11 is a flow diagram illustrating schematically the composition of a refractory liquid that can be utilized for the refractory composition with which the web is impregnated.

FIG. 14 is a schematic representation of curved lance pipe 69 secured to a transport means 72 prior to insertion in melting vat 1.

FIG. 15 is a schematic representation of curved lance pipe 69 secured to transport means 72 and in position within melting vat 1.

FIG. 16 is a schematic representation of curved lance pipe 69 secured to transport means 72 and removed from melting vat 1 after being partially consumed.

FIG. 17 is a perspective view of the transport means 72.

DESCRIPTION OF BEST MODE AND OTHER EMBODIMENTS

Figure 1:
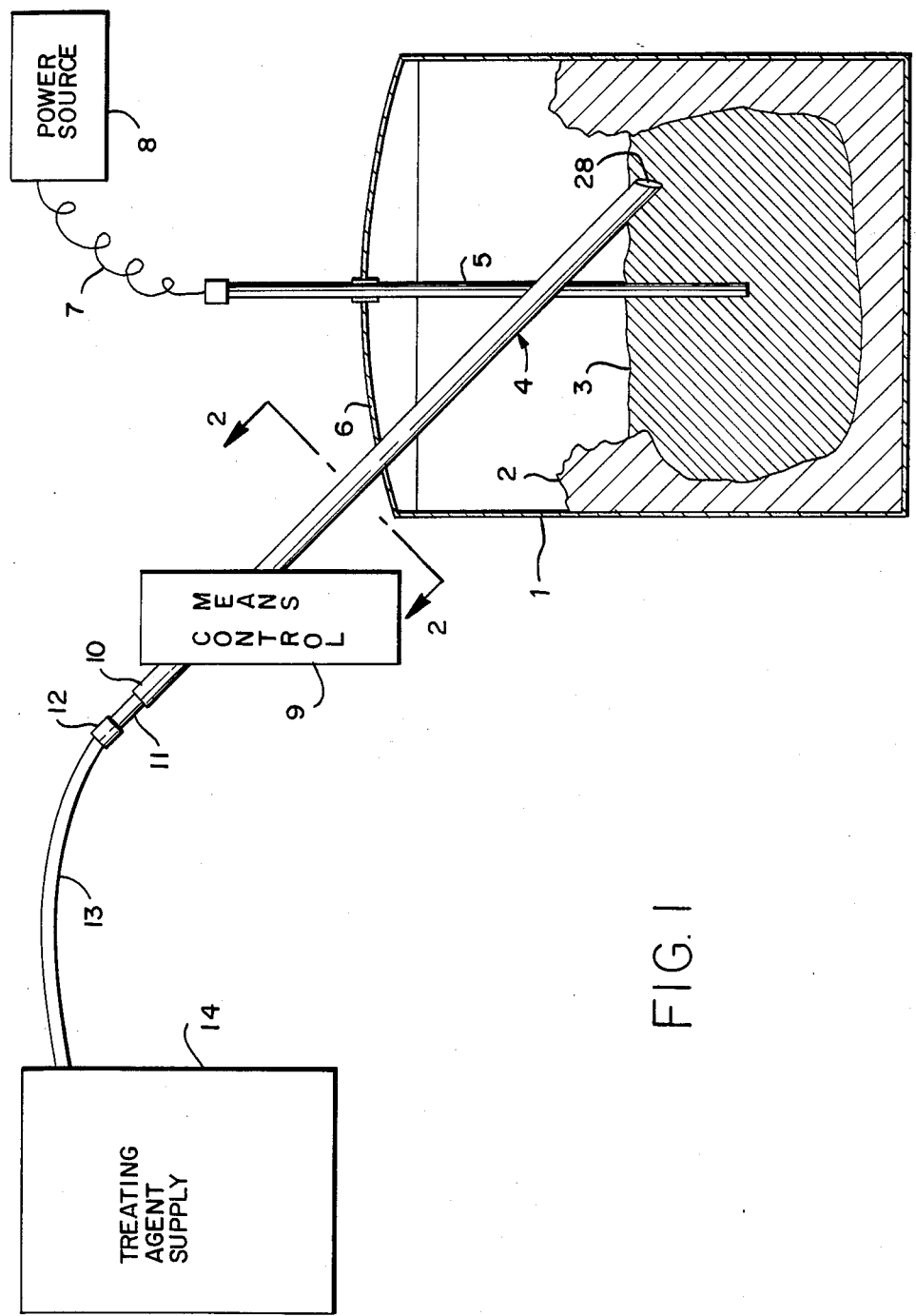
FIG. 1 is a schematic representation of a coated lance pipe 4 being utilized within a melting vat 1.

Referring now to the drawings in more detail, FIG. 1 is a schematic representation of a treating agent dispensing pipe or lance 4 being utilized within a melting vat 1. Melting vat 1 could be a vat which is utilized in melting and processing steel or any form of ferrous or non-ferrous metal composition. Melting vat 1 may be formed by a portion of a metal processing furnace. Melting vat 1 is shown as having a melting electrode 5 connected by wiring 7 to an electrical power source 8. Melting electrode 5 may be used to a melt a scrap metal mass 2 within the melting vat 1 to form a molten bath 3. Any number of melting electrodes 5 may be utilized, only one being shown for purposes of illustration.

The lance 4 may be placed through an overhead opening 6 in melting vat 1, the free end 28 of lance 4 being placed beneath the surface of molten bath 3 at any desired area within the melting vat 1. Through lance 4 flows a treating agent, such as a reducing gas to refine the metal, from a supply 14 of the treating agent. The treating agent flows through a flexible conveying conduit or hose 13 and through a pipe coupling 12 into the lance 4.

The lance 4 comprises a pipe base 11 with a coating material 10 secured thereto. Control means 9 moves the lance 4 within the melting vat 1. The control means 9 may be any pipe movement control means desired, including automatic machinery or manual means.

The supply 14 may supply a reducing gas of pure oxygen or of air or another mixture containing oxygen. The gas supplied may include a heating fuel such as propane for combustion in the furnace, or any other treating agent(s) as desired. The control means 9 causes movement of the lance 4 in a manner so that the treating agent is dispersed throughout the desired area. The treating agent(s) helps purify the desired metal to be recovered and the combustible fuel supplies heat by combustion to aid in melting scrap metal 2 into molten bath 3.

As shown in FIG. 2, lance 4 has a pipe base 11 and a coated web providing a coating 10 wrapped around the pipe base 11. The coating 10 comprises at least one layer of coated web material 29. A plurality of layers of coated web material may be wrapped around the pipe base 11 to form a multilayer cover for the pipe base 11. The web material is coated by impregnating the web with a liquid refractory coating composition. This composition provides sufficient adhesion to laminate the windings of the first layer to the pipe and successive layers to each other and to hold the coated web material in place on the pipe base until the composition sets, which further increases the adhesiveness of the first layer to the pipe and successive layers to each other.

The web material can be immersed in the coating composition or the coating composition can be applied to the dry web in any manner desired, such as by brushing. Various materials may be utilized for the dry web provided they are porous and water absorbent. The web may be burlap, cotton, wool or some other natural fiber or synthetic fiber having substantial porosity and water absorbance, such as porous fibers made from organic polymers. The web material is impregnated with a liquid refractory mortar of the type previously described.

The ingredients of the refractory composition utilized may be varied in order to minimize contamination of the metals being melted within the melting vat 1. Considerations for the metals being processed, including the pH values thereof, along with other factors, may be utilized in formulating the refractory composition for providing the coating 10. It is preferred that the overall pH of the coating substantially match the pH of the molten metal composition to be processed with the aid of the coated pipe. The preferred coating composition described above is neutral to slightly basic, use in processing a molten copper composition of comparable pH.

The coating of the invention extends the life span of the pipe base 11 considerably. However, after a period of time, even the coated pipe 4 will deteriorate within the melting vat 1. As the end 28 of lance 4 deteriorates, more of the lance 4 will be extended into the melting vat 1 in order to place the end 28 into the desired area. As the deterioration approaches a pre-determined length of the lance 4, the lance 4 is removed from the melting vat 1 and the end of base pipe 11 connected to pipe coupling 12 is disconnected from this coupling.

Pipe coupling 12 is then connected to one end of a new lance 26 as illustrated in FIG. 3. The other end of new lance 26 is secured to a non-reused pipe coupling 30. The unconsumed section of lance 4 is also secured to the non-reused pipe coupling 30. Thereby, when lance 4 is extended back into the melting vat 1, the complete length of this lance is utilized by being entirely consumed by heat disintegration into molten bath 3. The non-reused pipe coupling 30 also disintegrates and the second lance 26 becomes the means for the treating agent to enter the appropriate area of the melting vat 1 until the eventual disintegration of the second lance 26. Thereafter, the lance replacement process is continuously repeated.

As shown in FIG. 3, the lance 26 has a pipe base 16, and a refractory coating 15 secured around the pipe base 16. A small portion of the pipe base 16 extends out from the coating 15. This bare end portion has threads 19, which are secured within the threads 18 of non-reused coupling 30. The pipe base 11 of lance 4 also has a small portion extending out from the coating 10. This bare end portion of pipe base 11 has threads 17, which are secured within threads 18 of non-reused pipe coupling 30. The lance 4 is rigidly secured to the lance 26 by the non-reused pipe coupling 30.

One desirable method of wrapping either the dry or coated web is to tuck the leading free end 20 of the web 29 under the first winding of web 29 so as to form a locking relationship between the free end, the first winding and the pipe base at the beginning of the spiral wrapping in order to firmly secure the leading end portion of the web to the pipe base 11. The end 20 is carried around the pipe and placed underneath the first wrapping and is then wrapped over by one or more loose windings as shown in FIG. 4. The first layer of coated web material 29 is then drawn tightly around the pipe base 11 in order to secure the web so that it can be wound onto the pipe base 11 without requiring a separate fastener. This tuck locking arrangement is sufficiently secure to pull the web from a dispensing means and through a web coating device. In FIG. 5, the end 20 of web 29 is shown tucked tightly under the first wrapped layer of the coated web material in order to firmly secure the still wet coating onto the pipe base 11.

FIGS. 4 and 5 illustrate the beginning stages of wrapping a continuous web 29 of coated material around the pipe base 11 in accordance with a preferred method. In practice, the layers of coated web material may be applied to the pipe base 11 or any other substrate in any desired manner, and the web material may be of any desired shape and size. The web material may be applied to the substrate either before or after impregnation with the refractory composition. Continuous web 29 may be wrapped onto pipe base 11 so that successive windings are spaced any distance apart desired and successive layers are overlaid to any multiple layer thickness desired.

Figure 6:
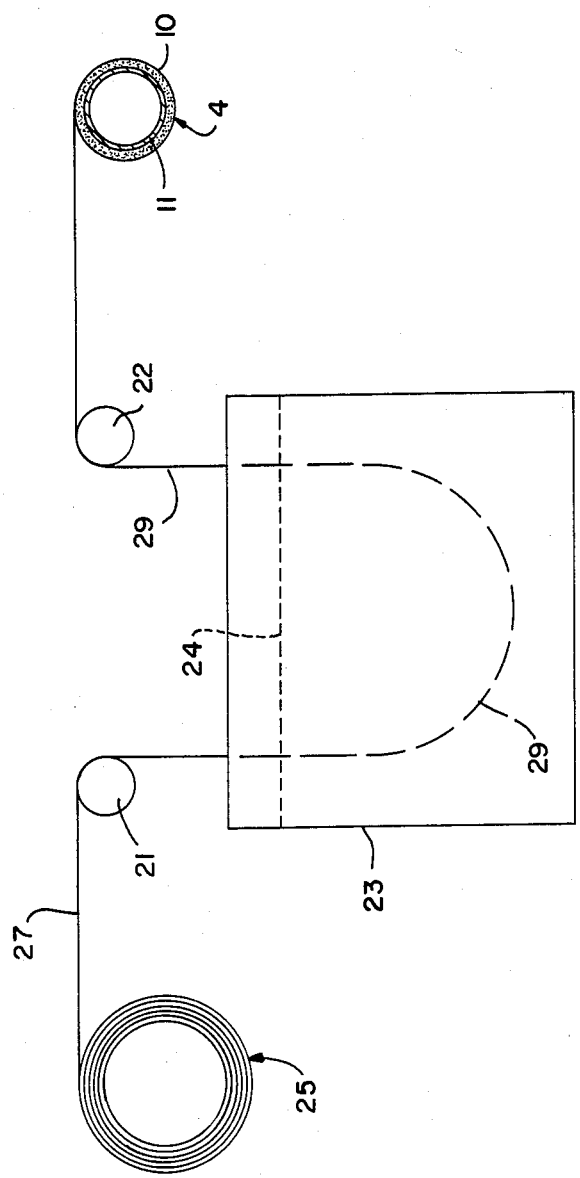
FIG. 6 is a schematic representation of an uncoated web 27 of material being removed from a material roll 25 and coated with a liquid refractory composition 24 to become a web 29 of coating material which is wrapped around pipe base 11 to form the composite pipe 4 having a refractory coating 10.

FIG. 6 is a schematic representation of an uncoated web 27 of fibrous material being removed from a supply roll 25 and coated with a refractory composition 24 to become a coated web 29, which is then wrapped around pipe base 11 to form the coated lance 4. The web 27 of uncoated material is shown entering over roller 21 into an impregnating vat 23 containing the coating composition 24. The web 29 of coated material is shown exiting over a second roller 22 and being wrapped around the pipe base 11 in order to form the coating 10 of composite lance 4. The uncoated web 27 of material can be immersed in the coating composition 24 or the coating composition can be applied to the uncoated web 27 without immersion, such as by passing the web between a pair of coating rollers or by brush or roller coating one side of the web at a time.

FIG. 7 is a top view of a pipe coating device 31. Pipe coating device 31 has a liquid holding trough 32. Liquid holding trough 32 has a back panel 33, a side panel 34, an opposing side panel 35, and a bottom panel 36. Utilized with trough 32 are a pipe turning means 42, a web fabric dispensing means 44, and a liquid coating dispensing means 43. To utilize the pipe coating device 31, a pipe segment 49 is secured by threads at one end to a threaded coupling 63. Coupling 63 is secured to a pipe drive shaft 53 which extends through a bearing flange 54. Pipe drive shaft 53 is connected to pipe turning means 42. The other end of pipe segment 49 is placed into an end bearing flange 64. The end bearing flange 64 and the drive shaft bearing flange 54 allow the drive shaft 53, the coupling 63, and the pipe 49 to be rotatably mounted over the trough 32 so that the entire length of pipe 49 may be turned by pipe turning means 42. Bearing flange 54 may provide one or more annular bearing surfaces on the inside and outside of the side panel 34 through which the pipe drive shaft 53 may extend and turn within.

Web dispensing means 44 may be movably mounted on a web dispensing bar 41. Web dispensing bar 41 is supported by bar end supports 37 and 38, support 37 having a slot 39 and support 38 having a slot 40 for receiving the ends of bar 41. If this configuration is utilized, the web dispensing bar 41 may be lifted from bar supports 37 and 38 and a new web dispensing means 44 can be added to replace the old web dispensing means 44, when all of the fabric or other web material is dispensed from the old web dispensing means 44.

Figure 9:
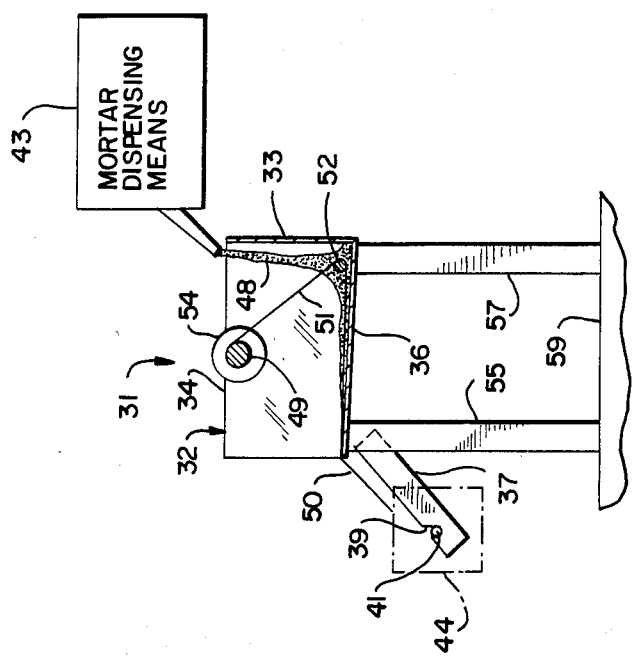
FIG. 9 is a cross-sectional view of pipe coating device 31 taken along lines 9—9 of FIG. 7.

The fabric web extends into the trough 32 and around a tension bar 52. Tension bar 52 can turn and is rotatably mounted at each end in annular bar bearing flanges 65 and 66. Bearing flange 65 is within side panel 34 of trough 32 and bearing flange 66 is within side panel 35 of trough 32. These bearing flanges frictionally engage the ends of bar 52 so that it will cause tension in the web. The dispensing means 43 dispenses the liquid coating composition 48 into the trough 32 so that the dry web 50 from web dispensing means 44 will pass through the liquid coating composition 48 while passing around tension bar 52. The composition 48 impregnates and adheres to the fabric or other wrapping material of dry web 50 to provide a coated web 51. The coated web 51 is wound onto pipe 49 when the pipe turning means 42 is activated to turn the drive shaft 53 which is rigidly secured to pipe 49. The turning of pipe 49 pulls the coated fabric 51 and winds it around pipe 49. While being pulled and wrapped, coated fabric 51 is tensioned by tension bar 52 and by being pulled over and around the outer front edge of bottom panel 36 of trough 32 as shown in FIG. 9. Fabric dispensing means 44 is moved along fabric bar 41 at a rate which determines the winding angle at which coated web 51 is placed onto pipe 49. This in turn establishes the number of spiral windings per unit of pipe length and thereby the number of layers of coated web forming the pipe coating.

When the coated web material 51 has covered the desired length of the bare pipe 49, a cutting means 45 may be used to cut the wound portion of the web from the continuous portion of the web supplied by dispensing means 44. The tail end of the cut fabric is then wrapped onto the pipe 49 as the last windings. The cutting means may comprise blades 46 and 47 which cooperate to cut the coated web 51.

Any excess liquid 48 on the pipe 49 may then be removed. This liquid preferably has a slurry-like consistency and is easily removed by hand or by a mechanical skimming means. The excess composition is preferably removed while the pipe 49 is over trough 32 so that the excess composition will drop back into trough 32 to be re-utilized. The coated pipe 49 is then uncoupled from the coupling 63 and removed from pipe coating device 31 in order for the coating to set and dry. The dried coated pipe may then be utilized as previously described.

The pipe turning means 42 may be any type of conventional pipe turning device from a simple manual pipe turning mechanism to any type of motor driven pipe turning apparatus desired. The pipe turning means 42 may be simply a motorized rotational means, such as a drill. The fabric dispensing means may be motorized and/or automated or simply a roll of fabric rotatably and slidably mounted on bar 41 so as to be unwound and moved along an axis parallel to the pipe as the pipe 49 is rotated. The dispensing means 44 may include not only means to dispense the fabric from a roll, but means to move the fabric roll along the dispensing bar 41. The human worker 60 may actually control movement of the roll with a portion of his body, such as his leg or knee.

The mortar dispensing means 43 may be any type of automated liquid or paste dispensing system or may be a very simple manual dispensing means, such as a person pouring mixed mortar into the holding trough 32. The cutting means 45 may be any type of cutting means from an automated cutting mechanism to the manual act of cutting the fabric web from a roll of web material with shears.

Trough 32 may be of any shape or size desired. The bottom panel 36 and the back panel 33 may be placed at any desired angle to form an angled rear to hold the liquid mortar composition 48 in the area where the web 50 passes around tension bar 52 and becomes impregnated with composition 48 to become coated wrapping material or coated web 51. The pipe coating device 31 has four support legs, 55, 56, 57, and a fourth leg not shown in the drawings, which support the trough 32. The bottom panel 36 of the trough 32 has a drain valve 58 in order to drain and clean the bottom panel 36 and the interior of trough 32. The pipe coating device 31 may be placed on any supporting surface, such as floor 59.

Figure 10:
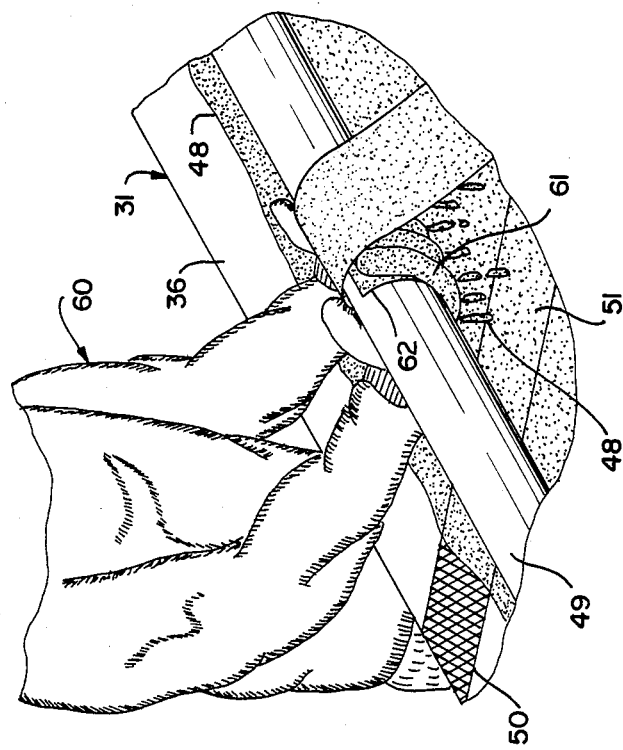
FIG. 10 is a fragmentary perspective view of a tucking procedure utilized to lock the free leading end 62 of coated web 51 onto pipe 49.

The web tucking and locking procedure utilized in the method and device for manufacturing the coated pipe is illustrated in FIG. 10. A human worker 60 with hands 61 may physically tuck the leading edge 62 of coated web 51 under the oncoming continuous web to form a tight tuck lock at the beginning of the wrapped coating. In this tuck lock, the leading end of the web is brought over the top of bare pipe 49, wound completely around it, and placed back up under the portion of web 51 which will form the next wrap and is coming forth from around the tension bar 52 after being coated with the refractory composition. When the leading edge 62 of the coated web is tucked under the oncoming coated web 51, turning means 42 is activated to rotate pipe 49 and pull the overlying wrap(s) tightly around the pipe, which jams the leading end portion 20 between the pipe surface and the overlying wrap(s) to securely lock the leading end portion of the web to the bare pipe 49 as shown in FIG. 5. By tuck locking the coated web 51 to the pipe 49 and then rotating the pipe with frictional drag to tension the web, friction and pressure are generated which securely lock the leading end 20 of the web between the pipe and the overlying wrap(s) of web 51. This tuck lock method provides a secure attachment of the beginning wraps of coated web 51 to the bare metal of pipe 49 and thereby eliminates the need for extraneous fasteners.

When pipe 49 with the web secured thereto is turned by the pipe turning means 42, more of the coated web 51 is pulled onto and wrapped around the pipe 49. As the fabric dispensing means 44 is moved along the fabric dispensing bar 41, the coated material 51 moves along the tension bar 52 and is wrapped around the pipe 49 in consecutive spirals which are overlapped or otherwise spaced relative to each other dependent on the speed of translational movement of dispensing means 44 relative to the speed of rotation of pipe 49.

The coated web 51 is preferably cut by the cutting means so that several inches of bare pipe before the end of pipe 49 are not covered with the coated web 51. The operator preferably manually wraps the lead and tail portions of the cut coated web 51 around the pipe 49 so as to leave at least about two inches of bare pipe exposed at each end. If the mid-portion of pipe 49 is only partially covered with coated web 51 when the dry web 50 runs out, the fabric dispensing means 44 can be replaced and the process begun again anywhere along the partially coated pipe 49 desired.

FIG. 11 is a flow diagram illustrating the chemical ingredients of a refractory composition that can be utilized for coating composition 24 or 48. As shown in FIG. 11, a refractory mixture 92 is produced from a combination of refractory powder 87, high temperature (calcined) refractory aggregate 88, binder 89, plasticizer 90, and liquid 91. According to this invention, the speed at which the refractory mixture 92 sets can be changed in several ways. A different binder might be added or a different web material might be used to carry the liquid refractory composition. The relative proportions of the ingredients also may be varied for the same purpose.

The refractory mixture 92, when dried at room temperature 93, will chemically bond due to the nature of the ingredients of the refractory mixture. When the chemically-bonded composition 94 is subjected to a fusing temperature 95, a ceramically-bonded composition 96 results. This ceramically-bonded composition 96 has ceramic bonds which provide an amorphous glass-like phase which holds the aggregate(s) together. Crystalline phases of ceramic compounds also may be present after fusion. The high temperature refractory aggregate 88 may simply be calcined kaolin, which is a refractory aggregate, or may be a combination of calcined refractory aggregates. One or more raw refractory aggregates may be ground or otherwise pulverized to provide refractory powder 87. Alternatively, a naturally fine raw clay or mixture of raw clays may be used alone or combined with a pulverized aggregate powder to provide refractory powder 87.

Refractory powder 87 and binder 89 provide strength and refractory properties to the coating 10 or 15 at high temperatures. The binder 89, basically, provides the strength of the mortar on air setting at ambient temperature. The plasticizer 90 helps provide a viscosity and consistency which enables the liquid refractory mixture 92 to be applied to dry web 50. The plasticizer 90 may or may not have refractory qualities, and is preferably a non-refractory organic material such as starch. The liquid 91 is preferably potable water.

The refractory mixture 92 may have a high or low viscosity, depending upon the amount of liquid 91 utilized. A relatively low viscosity is preferred. The amount of liquid 91 added to the dry refractory mortar is preferably an amount sufficient to make a smooth homogenous liquid of slurry-like consistency, namely, a soupy liquid having a viscosity substantially less than self-supporting paste and substantially greater than water alone (similar to milk of magnesia). A method and device for applying the refractory mixture 92 to the pipe 11 or 49 have been previously described with reference to compositions 24 and 48.

Figure 12:
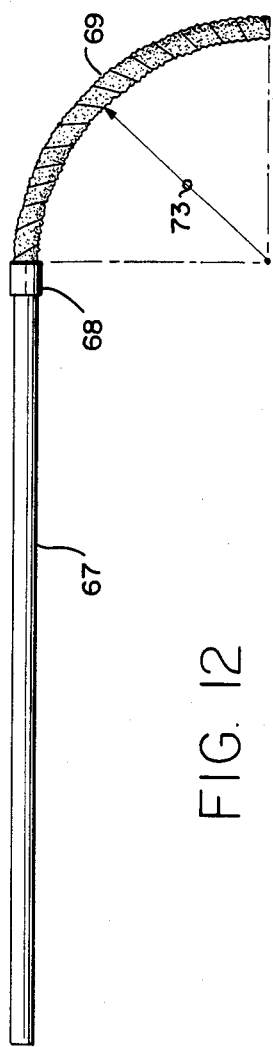
FIG. 12 is an elevational view of a curved lance pipe 69 connected to a treating agent supply pipe 67 by a coupling 68.

FIG. 12 is an elevational view of curved lance pipe 69 connected to an extension pipe 67 by a coupling 68. Curved lance pipe 69 has an appropriate radius of curvature 73, such as about thirty-six (36") inches or greater. The radius dimension 73 may be any desired radius which, in essence, would give a desired curve to lance pipe 69 without fracturing the dry refractory coating.

Figure 13:
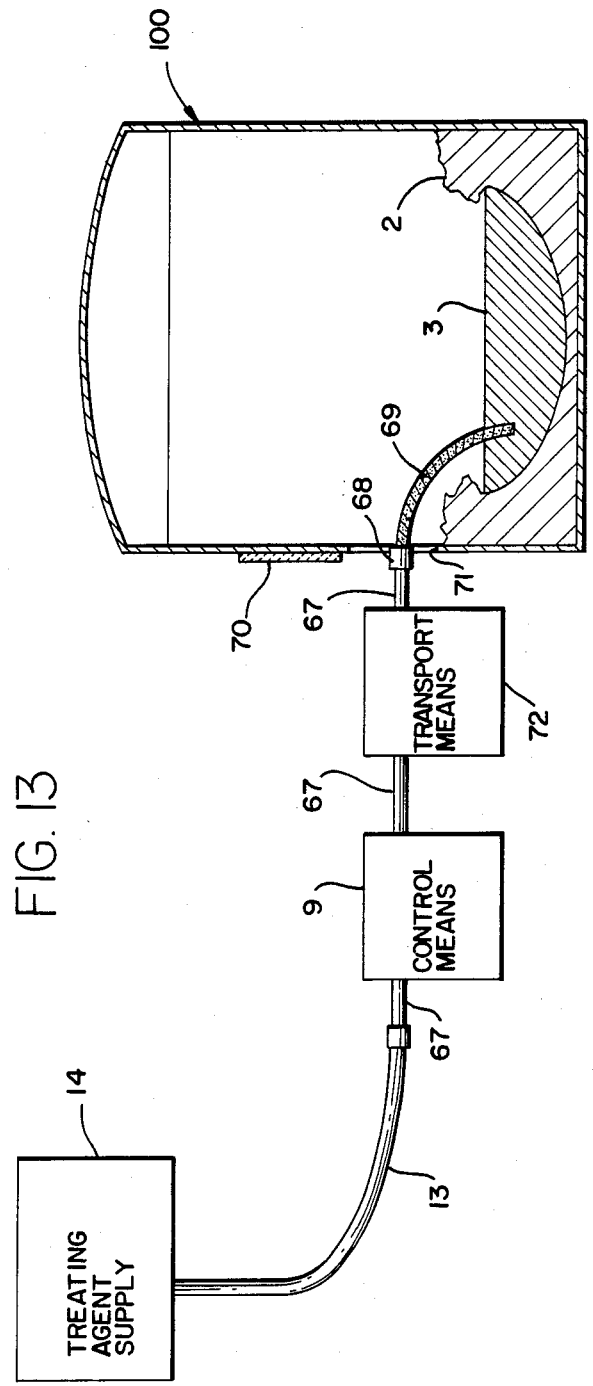
FIG. 13 is a schematic representation of curved lance pipe 69 being utilized in melting vat 1.

FIG. 13 is a schematic representation of curved lance pipe 69 being utilized in melting vat 100 having a side entry opening 71 normally covered by a door plate 70. In FIG. 1, a lance pipe 4 is shown being utilized in the melting or processing vat 1 having an overhead entry door. Any desired plurality of lance pipes 4 or 69 may be utilized at the same time through the same or different furnace doors.

It is desirable that the treating agent be placed directly into the molten solution 3. If a treating agent is added through a side door opening 71, the lance utilized may aim the treating agent and/or a combustible fuel above the molten metal solution 3 until such time as the pipe bends from the intense heat so that the curved end may then be dropped into the molten solution 3 to inject the treating agent below the surface of the molten solution. Instead of such heat bending which is relatively slow and is difficult to accomplish consistently and accurately, pipe 69 may be bent mechanically by any desired pipe bending apparatus after the refractory mixture 92 has set and cured at room temperature to form a chemically-bonded composition 94 on the pipe core 49. Such mechanical bending is along an arc preferably having a radius of at least 36 inches to avoid fracturing the coating.

FIG. 14 is a schematic representation of curved lance pipe 69 secured to a transport means 72 prior to insertion in melting vat 100. Transport means 72 is movable along floor 97 outside of melting vat 100. When a curved lance pipe 69 is secured through a coupling 68 to an extension or supply pipe 67, pipe 67 may be held at an appropriate level by the transport means 72. The treating agent flows from supply source 14, through flexible transporting conduit or tube 13, through extension pipe 67, which may be positioned by control means 9, through the curved lance pipe 69, and into the molten solution 3 through door opening 71.

FIG. 15 is a schematic representation of curved lance pipe 69 secured to transport means 72 and in position within melting vat 100. Door plate 70 has been moved to uncover opening 71. Transport means 72 has been moved toward melting vat 100 to place lance pipe 69 through the door opening 71 and to place the free end of curved lance pipe 69 into the molten solution 3. Treating agent may now be transported from its source 14, through the lance 69, and into the molten solution 3.

FIG. 16 is a schematic representation of lance 69 on transport means 72 after being partially consumed and removed from melting vat 100. After a period of time, even the coated pipe 69 of the present invention will be consumed by the molten solution 3. When a pre-determined portion of lance 69 is consumed, transport means 72 may be moved back from the melting vat 100, removing the remainder of curved lance 69 from the melting vat 100 through door opening 71. The unconsumed remainder of lance 69 may be removed from coupling 68 by pipe removal means, such as a large wrench, and a new curved lance pipe may be secured thereto in order to resume the process of adding further treating agent to the molten solution 3, as desired.

FIG. 17 is a perspective view of transport means 72. Means 72 may be replaced by any other desired transport means. Transport means 72 has a pipe base tray 74 to hold extension pipe 67. Pipe base tray 74 is supported on floor 97 by support legs 76, 77 and 78. A pipe holddown chain 75 may be placed over pipe 67 to secure this pipe and lance 69 to transport means 72. Support leg 77 has a caster base 80, support leg 78 has a caster base 79, and support leg 76 has a base plate 81. Support leg 76 may be raised in order to roll transport means 72 on caster bases 79 and 80 and thereby move transport means 72 toward and away from melting vat 100. The depth that the treating agent is placed into the molten solution 3 can be controlled by utilizing a predetermined radial bend in the curved lance pipe 69.

While the invention has been described with reference to specific embodiments, the description is illustrative and is not intended to be construed as limiting the scope of the invention. Various modifications and changes may occur to those skilled in the art without departing from the spirit and scope of the invention as defined by the following claims.

What is claimed is:

1. A heat resistant composite comprising a refractory coating adhered to a metal substrate, said composite being provided by:
   mixing a dry refractory mortar with water to provide a liquid refractory mixture;
   impregnating a water absorbent web of fibrous material with said mixture;
   coating a surface of said substrate by placing at least one layer of said impregnated web on said surface as a coating; and,
   drying said coating to remove said water from said web and said liquid refractory mixture and to cause said liquid refractory mixture to set and dry as a chemically bonded refractory composition adhered to said metal substrate and having said web embedded therein, said dry refractory mortar being suitable for laying refractory brick in the lining of metal refining furnaces and for causing said liquid refractory mixture when dried to form said chemically bonded refractory composition at ambient temperature and a ceramically bonded refractory composition at a fusing temperature above said ambient temperature.

2. The composite of claim 1 wherein said substrate is carbon steel.

3. The composite of claim 1 wherein said substrate is a metal pipe and said coated surface is on the exterior of said pipe.

4. The composite of claim 3 wherein said pipe is made of carbon steel.

5. The composite of claim 4 wherein said pipe surface is coated with a plurality of layers of said impregnated web.

6. The composite of claim 1 wherein said surface is coated with plurality of layers of said impregnated web.

7. The composite of claim 1 wherein said fibrous material comprises a porous organic material.

8. The composite of claim 1 wherein said fibrous material comprises burlap.

9. The composite of claim 8 wherein said burlap comprises jute.

10. The composite of claim 8 wherein said burlap is in the form of a woven fabric.

11. The composite of claim 10 in which said fabric has a warp with about 10 to 12 threads per inch and a weft with about 8 to 10 threads per inch.

12. The composite of claim 11 wherein said threads have a diameter of about 20 to about 60 mils.

13. The composite of claim 1 wherein said drying is provided by air at ambient conditions and said refractory coating is substantially dry within five days of commencement of said drying.

14. The composite of claim 1 wherein said refractory mortar comprises a calcined refractory aggregate having a particle size greater than about 65 mesh, a refractory powder having a particle size less than about 325 mesh, a binder, and a plasticizer.

15. The composite of claim 14 wherein said refractory aggregate is at least one of calcined flint clay, calcined kaolin clay and bauxite; wherein said refractory powder is at least one of flint clay and kaolin clay; wherein said binder is sodium silicate; and wherein said plasticizer is starch.

16. The composite of claim 15 wherein said refractory mortar comprises about 50% to about 60% calcined bauxite, about 20% to about 30% calcined kaolin clay, about 5% to about 15% raw kaolin clay, about 5% to about 15% sodium silicate, and about 1% to about 2.5% starch, the percentages of bauxite, clay and silicate being relative weight percentages excluding starch and the percentage of starch being a weight percentage relative to the total weight of said other ingredients.

17. The composite of claim 14 wherein a chemical analysis of said dry refractory mortar comprises about 67% alumina, about 27% silica and about 2% sodium oxide relative to the total weight of inorganic oxides.

18. The composite of claim 17 in which said dry refractory mortar further comprises about 1% to about 2.5% starch relative to the total weight of inorganic oxides.

19. The composite of claim 16 wherein said silicate is anhydrous, and wherein said bauxite is South American bauxite such as from the countries of Surinam or Guyana.

20. The composite of claim 14 wherein said water is mixed with said refractory mortar in a weight ratio of about 0.12 to about 0.14.

21. The composite of claim 14 wherein said refractory composition is subsequently heated to a temperature sufficient to cause ceramic bonding thereof.

22. The composite of claim 21 in which said refractory composition becomes ceramically bonded at a temperature in the range of 1500° F. to 2000° F.

23. The composite of claim 1 which is bendable after air drying at ambient conditions through an arc of 90° having a radius of about 36 inches without fracture of said coating or separation of said coating from said substrate.

24. A heat resistant composite comprising a refractory coating adhered to a metal pipe, said composite being provided by:
mixing a dry refractory mortar with water to provide a liquid refractory mixture;
impregnating a water absorbent web of fibrous material with said mixture;
coating at least a portion of the exterior surface of said pipe by placing at least one layer of said impregnated web on said surface portion;
drying said coating to remove said water from said web and said liquid refractory mixture and to cause said liquid refractory mixture to set and dry as a chemically bonded refractory composition adhered to said surface portion of the metal pipe and having said web embedded therein;
said metal pipe being made of a carbon steel,
said fibrous web being made of burlap,
and said dry refractory mortar being suitable for use in laying refractory brick in the lining of metal refining furnaces and for causing said liquid refractory mixture when dried to form said chemically bonded refractory composition at ambient temperature and a ceramically bonded refractory composition at a fusing temperature above said ambient temperature.

25. The composite of claim 24 in which said fusing temperature is sufficient to cause combustion of said burlap.

26. The composite of claim 1 in which said web is made of a non-refractory material, and said fusing temperature is sufficient to cause combustion of said non-refractory web.

27. The composite of claim 26 in which said fusing temperature is in the range of 1,500° F. to 2,000° F.

28. The composite of claim 1 in which said dry refractory mortar contains sufficient silica to provide an amorphous-glass phase in said ceramically bonded refractory composition.

29. The composite of claim 1 in which said substrate comprises a metal pipe, and said refractory coating is adhered to the exterior of said metal pipe to form a composite pipe, said composite pipe being consumable at a rate at least about one-tenth of the rate of consumption of said metal pipe when immersed in a molten metal composition having a temperature in the range of 2000° F. to 3200° F.

30. The composite of claim 1 in which said dry refractory mortar comprises less than about 20% by weight of calcium oxide.

31. The composite of claim 30 in which said dry refractory mortar does not contain more than about 0.05 weight percent calcium oxide.

32. The composite of claim 1 in which said refractory coating has a maximum service temperature of about 3,200° F.

33. A heat resistant composite pipe comprising:
a metal pipe; and,
a chemically bonded refractory coating adhered to at least a portion of the exterior surface of said pipe and having embedded therein a web of water absorbent, non-refractory material such that said composite pipe is bendable at ambient conditions through an arc of 90° having a radius of at least about 36 inches without fracture of said refractory coating or separation of said refractory coating from said pipe;
said chemically bonded refractory coating having been formed by wrapping said exterior surface portion with a length of said web impregnated with a liquid refractory mixture made by mixing with water a dry refracory mortar suitable for laying refractory brick in the lining of metal refining furnaces, and drying said wrapping to remove said water from said web and said liquid refractory mixture and to cause said liquid refractory mixture to set and dry as said chemically bonded refractory coating, the composition of said dry refractory mortar being such that said liquid refractory mixture when dried forms said chemically bonded refractory composition at ambient temperature and a ceramically bonded refractory composition at a fusing temperature above said ambient temperature.

* * * * *